(12) United States Patent
Higuchi

(10) Patent No.: US 8,522,319 B2
(45) Date of Patent: Aug. 27, 2013

(54) COMPUTER READABLE MEDIUM STORING PROGRAM, INFORMATION PROCESSING APPARATUS, AND INFORMATION PROCESSING METHOD

(75) Inventor: Yasuyuki Higuchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 278 days.

(21) Appl. No.: 13/019,025

(22) Filed: Feb. 1, 2011

(65) Prior Publication Data

US 2011/0314521 A1    Dec. 22, 2011

(30) Foreign Application Priority Data

Jun. 16, 2010    (JP) .................................. 2010-137095

(51) Int. Cl.
*G06F 21/00*    (2006.01)

(52) U.S. Cl.
USPC ............................................................. 726/4

(58) Field of Classification Search
USPC ............................................................. 726/4
See application file for complete search history.

(56) References Cited

U.S. PATENT DOCUMENTS

| 6,687,878 B1 * | 2/2004 | Eintracht et al. ............... 715/201 |
| 2004/0088332 A1 * | 5/2004 | Lee et al. ........................ 707/200 |
| 2011/0239102 A1 * | 9/2011 | Tanaka et al. .................. 715/230 |

FOREIGN PATENT DOCUMENTS

| JP | 11-015818 A | 1/1999 |
| JP | 2002-288042 A | 10/2002 |

* cited by examiner

*Primary Examiner* — Kambiz Zand
*Assistant Examiner* — Aubrey Wyszynski
(74) *Attorney, Agent, or Firm* — Sughrue Mion, PLLC

(57) ABSTRACT

A computer readable medium storing a program causing a computer to execute a process is provided. The process includes obtaining note content information representing note content included in a note if the note has been input to registered information; obtaining user specification information for specifying a user who has input the note; causing the note content information and the user specification information to be stored in a memory in association with the registered information; and outputting at least one of the registered information, and the note content information and the user specification information stored in the memory to a user as a request source, and not outputting at least the user specification information if the user as the request source is different from the user who has input the note, in response to a request for outputting information from the user as the request source.

15 Claims, 9 Drawing Sheets

FIG. 3

| DOCUMENT (DOCUMENT ID) | STATUS |
|---|---|
| . . . | . . . |

FIG. 4

| DOCUMENT (DOCUMENT ID) | USER WHO HAS INPUT NOTE (USER ID) | NOTE CONTENT INFORMATION |
|---|---|---|
| . . . | . . . | . . . |

FIG. 6A

| IMPORTANCE | SCORE |
|---|---|
| HIGH | 4 |
| MIDDLE | 2 |
| LOW | 1 |

FIG. 6B

| PORTION TO BE CORRECTED | SCORE |
|---|---|
| CHAPTER 1 | 1 |
| CHAPTER 2 | 4 |
| . . . | . . . |

FIG. 6C

| RELIABILITY | SCORE |
|---|---|
| HIGH | 3 |
| MIDDLE | 2 |
| LOW | 1 |

COMPUTER READABLE MEDIUM STORING PROGRAM, INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2010-137095 filed Jun. 16, 2010.

BACKGROUND (i) Technical Field

The present invention relates to a computer readable medium storing a program, an information processing apparatus, and an information processing method.

SUMMARY

According to an aspect of the invention, there is provided a computer readable medium storing a program causing a computer to execute a process. The process includes: obtaining note content information representing note content included in a note if the note has been input to registered information; obtaining user specification information for specifying a user who has input the note; causing the obtained note content information and the obtained user specification information to be stored in a memory in association with the registered information; and outputting at least one of the registered information, and the note content information and the user specification information stored in the memory to a user as a request source, and not outputting at least the user specification information if the user as the request source is different from the user who has input the note and who is specified by the user specification information stored in the memory, in response to a request for outputting information from the user as the request source.

BRIEF DESCRIPTION OF THE DRAWINGS

Exemplary embodiment(s) of the present invention will be described in detail based on the following figures, wherein:

FIG. 3 is a diagram illustrating an example of content of a status DB;

FIG. 4 is a diagram illustrating an example of content of a note DB;

FIG. 6A is a diagram illustrating an example of a score table;

FIG. 6B is a diagram illustrating an example of a score table;

FIG. 6C is a diagram illustrating an example of a score table;

DETAILED DESCRIPTION

Hereinafter, an exemplary embodiment of the present invention will be described in detail with reference to the drawings.

Document Management System

Figure 1:
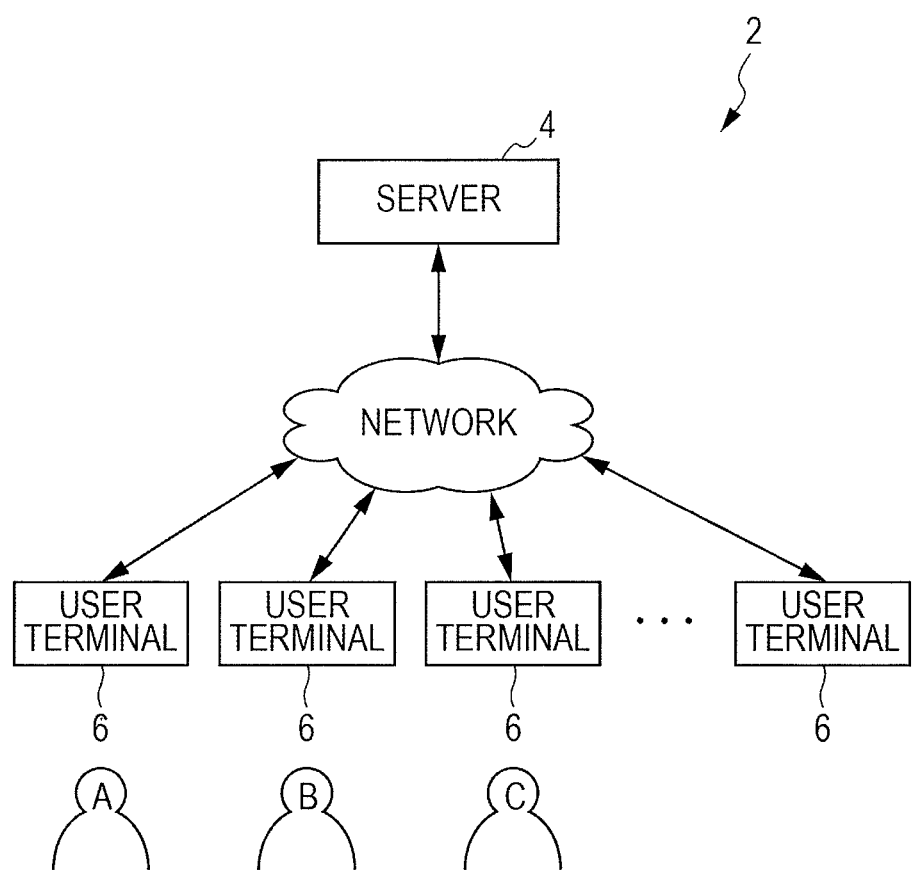
FIG. 1 is a diagram illustrating an example of a configuration of a document management system.

FIG. 1 is a diagram illustrating an example of a configuration of a document management system 2. The document management system 2 is used by a company, for example, and includes a server 4 (information processing apparatus) that provides a document management service and user terminals 6 of individual users. As illustrated in FIG. 1, the server 4 and the individual user terminals 6 are connected to a network, so that the server 4 may communicate with each of the user terminals 6. Each user logs in to the server 4 and then uses the document management service. In FIG. 1, the first user terminal 6 from the left is used by user A, the second user terminal 6 from the left is used by user B, and the third user terminal 6 from the left is used by user C.

User Terminal

Each of the user terminals 6 is a computer, such as a personal computer, a mobile phone, a mobile game machine, or a personal digital assistant (PDA), including a microprocessor, an operation unit, a memory, a display, etc. The user terminal 6 transmits information to the server 4 or receives information transmitted from the server 4 in accordance with a user operation. Also, the user terminal 6 causes the display to display the information transmitted from the server 4.

Server

Figure 2:
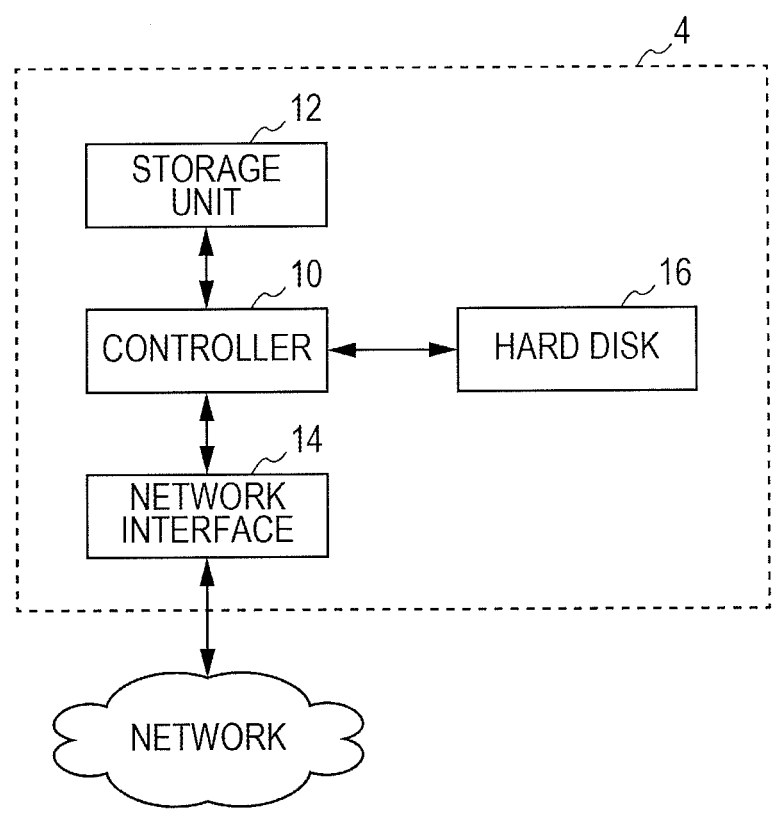
FIG. 2 is a diagram illustrating an example of a configuration of a server.

FIG. 2 is a diagram illustrating an example of a configuration of the server 4. As illustrated in FIG. 2, the server 4 includes a controller 10, a storage unit 12, a network interface 14, and a hard disk 16.

The controller 10 is a microprocessor, for example. The controller 10 executes information processing in accordance with a program stored in the storage unit 12.

The storage unit 12 is a random access memory (RAM), for example. The foregoing program is stored in the storage unit 12. The program may be read from a computer readable information storage medium, such as a digital versatile disc) (DVD®)-read only memory (ROM), and may be stored in the storage unit 12. Alternatively, the program may be supplied through a communication network or the like and may be stored in the storage unit 12.

Also, various types of data necessary for information processing are stored in the storage unit 12.

The network interface 14 (hereinafter referred to as network IF 14) is a network interface card, for example. The network IF 14 serves as an interface for transmitting data to/receiving data from each of the user terminals 6. The network IF 14 transmits information in accordance with an instruction of the controller 10. Also, the network IF 14 receives information and outputs it to the controller 10.

The hard disk 16 (memory) is a storage medium for storing various types of information. In this exemplary embodiment, a document database (hereinafter referred to as document DB) is held in the hard disk 16. Plural documents registered in the document management system 2 are stored in the document DB. In this exemplary embodiment, each document corresponds to "registered information".

Also, a status database (hereinafter referred to as status DB) is held in the hard disk 16. The statuses of individual documents are stored in the status DB. FIG. 3 is a diagram illustrating an example of the content of the status DB. As illustrated in FIG. 3, a document ID, which is identification information of a document, and the status of the document are stored in the status DB in association with each other. In this exemplary embodiment, any of a first status, a second status, and a third status is stored as the status of the document in the status DB. For example, if the status of document X is the first status or the second status, this means that document X is released. On the other hand, if the status of document X is the third status, this means that the release of document X is suspended.

The difference between the first status and the second status will be described below (see steps S202 to S204 in FIG. 7).

Also, a note database (hereinafter referred to as note DB) is held in the hard disk 16. The note DB holds a user ID of a user who has input a note to a document, and note content information representing the content of the note input by the user. Here, "note" is information including information representing the degree of importance (described below), a correction to be added to registered information (e.g., document), the portion to be corrected in the registered information (e.g., document), etc. FIG. 4 is a diagram illustrating an example of the content of the note DB. As illustrated in FIG. 4, the note DB stores a user ID of a user who has input a note to a document (user specification information) and note content information representing the note input by the user in association with the document ID of the document. The details of the note content information will be described below.

As well as the document DB, the status DB, and the note DB, various types of information are stored in the hard disk 16. For example, information representing the attributes of respective users and information for specifying the creator of each document are stored in the hard disk 16. Here, the attributes of a user include reliability representing the degree of reliability of the user, the login password of the user, the department to which the user belongs, the employment position of the user, etc.

Input of Note

In the document management system 2, after a document has been registered by a user who creates the document, the status of the document is set to the first status, so that the document may be viewed by individual users. For example, when user B wants to view document X created by user A, user B performs a view operation for document X in order to request the server 4 to distribute document X. Then, user B views document X distributed from the server 4 in his/her user terminal 6. Note that performing a view operation for document X corresponds to "request for outputting information".

Also, in the document management system 2, if user B who is viewing document X finds a mistake in the content described in document X, user B may point out the mistake in document X. Specifically, user B who has found a mistake may input a "note", which includes the portion of the mistake (hereinafter referred to as portion to be corrected), correct description for the portion to be corrected (hereinafter referred to as correction), and the degree of importance. Here, any one of "high", "middle", and "low" is input as the degree of importance.

Figure 5:
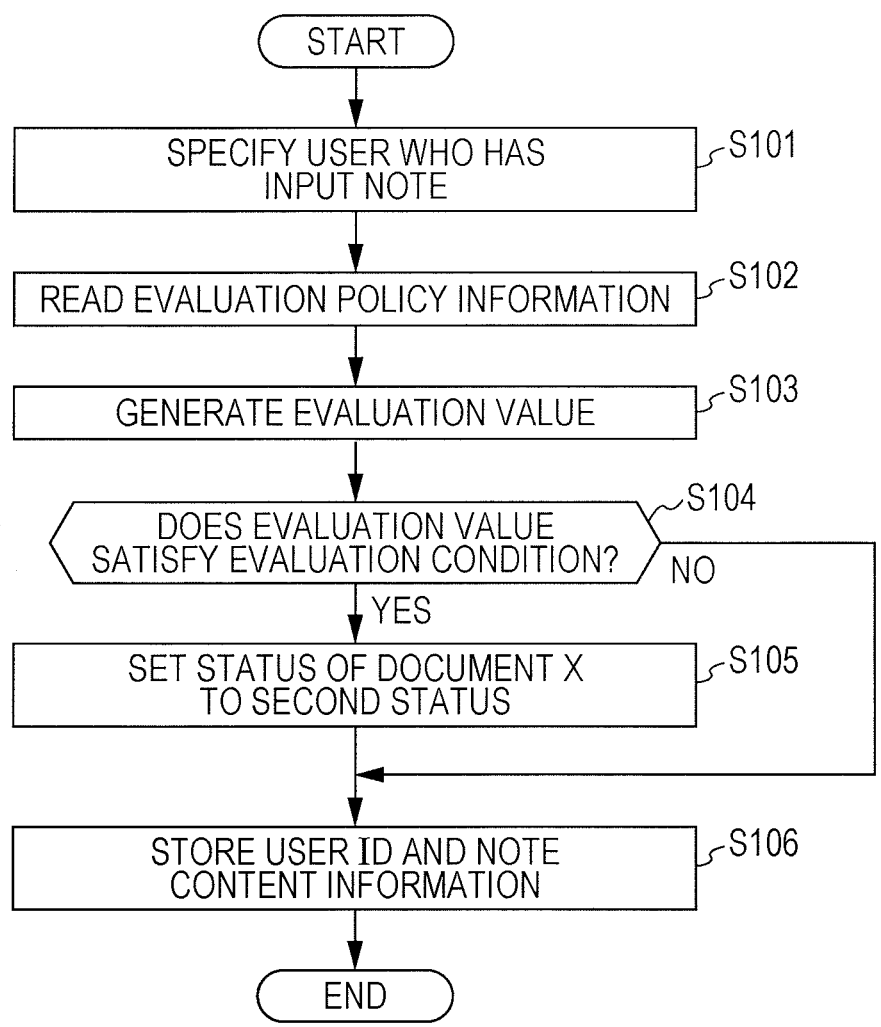
FIG. 5 is a flowchart illustrating an example of a process executed in the server.

After the note has been input, the note content information including the portion to be corrected, the correction, and the degree of importance is transmitted to the server 4. Then, the process illustrated in FIG. 5 is executed in the server 4 that has received the note content information.

Hereinafter, the process illustrated in FIG. 5 will be described. FIG. 5 is a flowchart illustrating an example of the process executed in the server 4, which is executed when note content information is received.

First, the controller 10 specifies the user who has input a note (here, user B) in step S101. Specifically, the controller 10 obtains the user ID of the user who has input the note.

In steps S102 and S103, the controller 10 calculates an evaluation value on the basis of the received note content information (hereinafter referred to as "present note content information") and the user ID of the user who has input the note. In this exemplary embodiment, past note content information is also used, which is stored in the note DB in association with the user ID of the user who has input the note.

Specifically, the controller 10 reads evaluation policy information that is stored in advance in the hard disk 16 (basic evaluation information memory) in step S102. FIGS. 6A to 6C are diagrams illustrating three score tables included in the evaluation policy information, respectively. The score table illustrated in FIG. 6A (condition memory) shows the scores assigned to the respective degrees of importance. The score table illustrated in FIG. 6B (condition memory) shows the scores assigned to the respective portions of document X. The score table illustrated in FIG. 6C (condition memory) shows the scores assigned to the three degrees of reliability.

The score table illustrated in FIG. 6A includes an "importance" field and a "score" field. The degrees of importance are stored in the "importance" field. In other words, conditions regarding note content information are stored in the "importance" field. For example, if the degree of importance included in note content information is "high", the note content information satisfies the condition represented by "high" stored in the "importance" field. In the "score" field, the scores assigned to the respective degrees (basic evaluation information) are stored. As illustrated in FIG. 6A, the information stored in the "importance" field and the information stored in the "score" field are associated with each other.

The score table illustrated in FIG. 6B includes a "portion to be corrected" field and a "score" field. The portions of document X are stored in the "portion to be corrected" field. In other words, conditions regarding note content information are stored in the "portion to be corrected" field. For example, if the portion to be corrected included in note content information is "chapter 1", the note content information satisfies the condition represented by "chapter 1" stored in the "portion to be corrected" field. In the "score" field, the scores assigned to the respective portions (basic evaluation information) are stored. As illustrated in FIG. 6B, the information stored in the "portion to be corrected" field and the information stored in the "score" field are associated with each other.

The score table illustrated in FIG. 6C includes a "reliability" field and a "score" field. The degrees of reliability are stored in the "reliability" field. In other words, conditions regarding reliability (attribute) are stored in the "reliability" field. For example, if the degree of reliability of the user who has input a note (user B) is "high", the reliability of user B satisfies the condition represented by "high" stored in the "reliability" field. In the "score" field, the scores assigned to the respective degrees of reliability (basic evaluation information) are stored. As illustrated in FIG. 6C, the information stored in the "reliability" field and the information stored in the "score" field are associated with each other.

Then, the controller 10 generates an evaluation value (evaluation information) by referring to the evaluation policy information in step S103. Specifically, the controller 10 generates an evaluation value on the basis of the note content information. More specifically, the controller 10 specifies the scores associated with the conditions which the note content information satisfies by referring to the score tables illustrated in FIGS. 6A and 6B and performs calculation on the basis of the scores, thereby calculating an evaluation value. For example, if the degree of importance included in the note content information is "high", four points are added. Also, if the portion to be corrected included in the note content information is "chapter 1", one point is added. Also, the controller 10 reads the reliability (attribute information) of the user who has input the note (user B) on the basis of the user ID (user specification information) obtained in step S101, and generates an evaluation value on the basis of the read reliability. More specifically, the controller 10 specifies the score associated with the condition which the read reliability satisfies by referring to the score table illustrated in FIG. 6C and performs calculation on the basis of the score, thereby calculating evaluation information. For example, if the degree of reliability of the user who has input the note is "high", three points are added.

Additionally, the controller 10 may calculate an evaluation value on the basis of one of the note content information and the reliability of the user who has input the note. For example, the controller 10 may calculate an evaluation value using any one of the score table illustrated in FIG. 6A, the score table illustrated in FIG. 6B, and the score table illustrated in FIG. 6C.

Alternatively, the reliability of the user who has input the note may be determined on the basis of an attribute other than the reliability of the user. For example, the controller 10 may determine the reliability of the user who has input the note on the basis of the department to which the user belongs. For example, the controller 10 may compare the department to which the user belongs with a reference department, and determine the reliability on the basis of the comparison result. Here, "reference department" is a department to which the user who has created document X belongs, a department that has a certain relationship with document X (e.g., a department deeply correlated with document X), or the like. If the department to which the user who has input the note belongs matches the reference department, the controller 10 may determine the reliability to be "high". Also, for example, the controller 10 may determine the reliability of the user who has input the note on the basis of the employment position of the user. For example, the controller 10 may determine the reliability of the user who has input the note to be "high" if the user is an executive.

After calculating the evaluation value in this manner, the controller 10 judges whether the evaluation value satisfies an evaluation condition or not in step S104. Specifically, the controller 10 judges whether the evaluation value is equal to or larger than a reference value or not. Here, a case where the evaluation value satisfies the evaluation condition is a case where the evaluation value is equal to or larger than the reference value, and a case where the evaluation value does not satisfy the evaluation condition is a case where the evaluation value is smaller than the reference value.

If the evaluation value satisfies the evaluation condition (YES in step S104), it is judged that the note input by the user (user B) is highly appropriate, and thus the controller 10 sets the status of document X, stored in the status DB, to the second status in step S105. As a result, the status of document X is updated. Then, the present note content information is registered in the note DB. That is, the controller 10 stores the present note content information and the user ID of user B, the user who has input the note, in the note DB (see FIG. 4) in association with document X in step S106.

On the other hand, if the evaluation value does not satisfy the evaluation condition (NO in step S104), the controller 10 skips step S105 and executes step S106. In this case, if the evaluation value does not satisfy the evaluation condition, the status of document X is not updated.

Viewing of Document

The note content information that has been registered in the above-described manner is viewed by individual users. Specifically, a user views the note content information of document X by performing the above-described view operation (output request) for document X. For example, if a user other than the user who has created document X (user A) has performed a view operation, it is judged whether the user who has performed the view operation is the user who has input the note (user B) and who is specified by the user ID (user specification information) associated with document X. If the user who has performed the view operation is different from the user who has input the note (user B), the process illustrated in FIG. 7 is executed.

Hereinafter, the process illustrated in FIG. 7 will be described. FIG. 7 is a flowchart illustrating an example of a process executed in the server 4. The controller 10 executes the process illustrated in FIG. 7, thereby outputting at least one of document X, and the note content information and the user ID of the user who has input the note (user B) stored in the note DB in association with document X to the user who has performed the view operation (the user as a request source). Here, it is assumed that user C has performed the view operation.

That is, the controller 10 judges whether the status of document X is the third status or not in step S201. If the status of document X is not the third status (NO in step S201), the controller 10 performs control so that at least the user ID of the user who has input the note (user B), among document X, and the note content information and the user ID of user B stored in association with document X, is not output to the user who has performed the view operation (user C) so that the user who has input the note (user B) is not specified by the user who has performed the view operation (user C) (steps S202 to S204).

Specifically, the controller 10 judges whether the status of document X is the second status or not in step S202. If the status of document X is the first status (NO in step S202), it is judged that the appropriateness of the note made for document X is low, and thus the controller 10 outputs only document X to user C. In other words, the controller 10 does not output the note content information and the user ID of the user who has input the note (user B), which are stored in the note DB in association with document X, to user C. Specifically, the controller 10 transmits only document X to the user terminal 6 of user C in step S203. As a result, document X is displayed on the display of the user terminal 6 of user C. User C may input a note in the above-described manner if he/she finds any mistake.

On the other hand, if the status of document X is the second status (YES in step S202), it is judged that the appropriateness of the note made for document X is high, and thus the controller 10 outputs document X and the note content information associated with document X to user C. In other words, the controller 10 does not output the user ID of the user who has input the note (user B), which is stored in the note DB in association with document X, to user C. Specifically, the controller 10 transmits document X and the note content information to the user terminal 6 of user C in step S204. As a result, document X and a list of corrections represented by the note content information are displayed on the display of the user terminal 6 of user C. In this case, too, user C may input a note in the above-described manner if he/she finds any mistake.

As described above, if the evaluation value satisfies the evaluation condition, the status of document X is set to the second status (step S105 in FIG. 5). Therefore, as a result, step S204 is performed if the evaluation value satisfied the evaluation condition, and step S203 is performed if the evaluation value does not satisfy the evaluation condition.

If the status of document X is the third status (YES in step S201), the controller 10 stores the user ID of the user who has performed the view operation (user C) in a view database (not illustrated) provided in the hard disk 16 in association with document X in step S205. Then, the controller 10 transmits, to the user terminal 6 of user C, an announcement document for announcing that release of document X is suspended in step S206. As a result, the announcement document is displayed on the display of the user terminal 6 of user C.

If the user who has performed the view operation is the same as the user who has input the note, that is, if the user who has input the note (user B) has performed the view operation, only step S203 or step S204 is executed regardless of the status of document X. That is, in this case, the controller 10 outputs at least document X regardless of the status of document X.

If the user who has created document X (user A) has performed the view operation, only step S204 is executed regardless of the status of document X.

Operation Performed by User as Creator

In the document management system 2, a user is authorized to correct the document created by himself/herself. Also, a user is authorized to suspend the release of the document created by himself/herself. If a user has viewed the document created by himself/herself, he/she performs the operation illustrated in FIG. 8 in an ordinary case. For example, user A views document X created by himself/herself and performs an operation in accordance with the operation flow illustrated in FIG. 8.

That is, user A performs a suspension operation for setting the status of document X to the third status in order to suspend the release of document X that includes a wrong description in step S301. Upon the suspension operation, a suspension instruction is transmitted to the server 4, and the controller 10 of the server 4 that has received the suspension instruction sets the status of document X stored in the status DB to the third status.

Also, user A performs a correction operation for correcting document X while referring to the note content information in step S302. Upon the correction operation, a correction instruction is transmitted to the server 4, and the controller 10 of the server 4 that has received the correction instruction updates document X stored in the document DB in accordance with the correction instruction.

Figure 9:
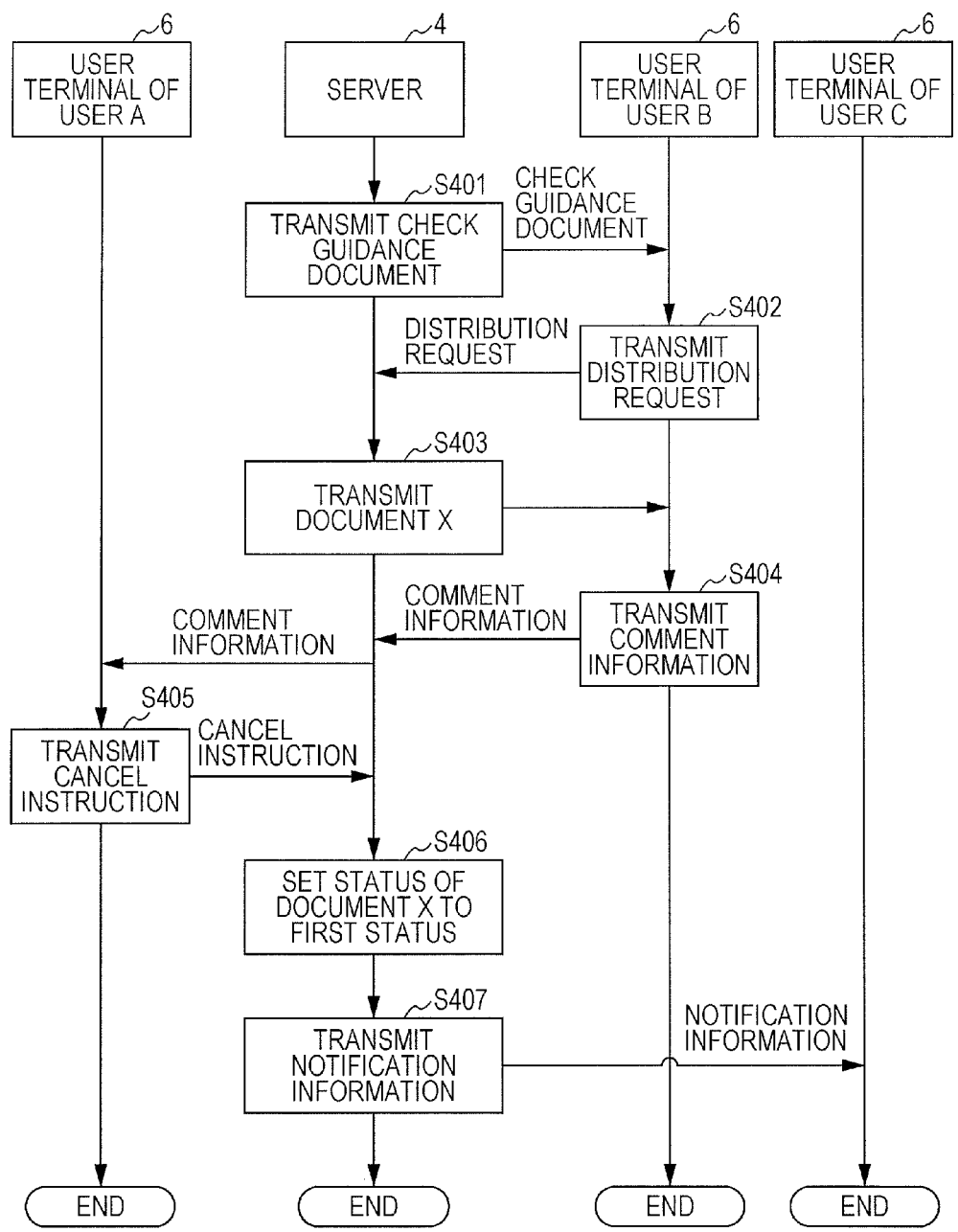
FIG. 9 is a diagram illustrating an example of a process executed in the document management system.

Then, user A performs a request operation in order to request user B, the user who has input the note, to check the content of document X in step S303. Upon the request operation, a request instruction is transmitted to the server 4, and the process illustrated in FIG. 9 is executed in the document management system 2.

Process Executed in Document Management System

Upon receiving the request instruction, the controller 10 of the server 4 executes a check guidance process for the user who has input the note stored in the note DB in association with document X (here, user B). Specifically, the controller 10 of the server 4 transmits, to the user terminal 6 of user B, a check guidance document for guiding user B to check the correction performed on document X in step S401. Here, the check guidance document is an e-mail, for example.

User B who has read the check guidance document performs a view operation in order to check the content of document X. After the view operation has been performed, a request for distributing document X is transmitted to the server 4 in step S402. The controller 10 of the server 4 that has received the distribution request executes step S203 or S204 illustrated in FIG. 7 to transmit document X to the user terminal 6 of user B, the user who has input the note, in step S403. As a result, document X is displayed in the user terminal 6 of user B.

User B performs a comment input operation, which is an operation for checking the correction, thereby inputting a comment regarding the correction while referring to document X. After the comment input operation has been performed, comment information representing the input comment is transmitted to the server 4 in step S404. The controller 10 of the server 4 receives the comment information and transfers the comment information to the user terminal 6 of user A, the user who has created document X. As a result, the comment information is displayed in the user terminal 6 of user A.

User A checks the comment information. If user A judges that it is necessary to further correct document X, user A performs the above-described correction operation and request operation again (see steps S302 and S303 in FIG. 8). In this case, steps S401 to S404 are executed again. If the correction operation and request operation are performed again, the controller 10 may update the reliability of user B, the user who has input the note.

On the other hand, if user A judges that it is not necessary to further correct document X, user A performs a cancel operation for setting the status of document X to the first status in order to release document X again. Upon the cancel operation, a cancel instruction is transmitted to the server 4 in step S405, and the controller 10 of the server 4 that has received the cancel instruction sets the status of document X stored in the status DB to the first status in step S406.

Then, in step S407, the controller 10 performs a notification process for a user who has performed a view operation until the status of document X is set to the first status in step S406. That is, in step S407, the controller 10 reads the user ID of user C who has performed the view operation stored in the foregoing view database (hereinafter referred to as view DB) in association with document X, and transmits notification information to the user terminal 6 of user C specified by the user ID.

Functional Blocks

Figure 10:
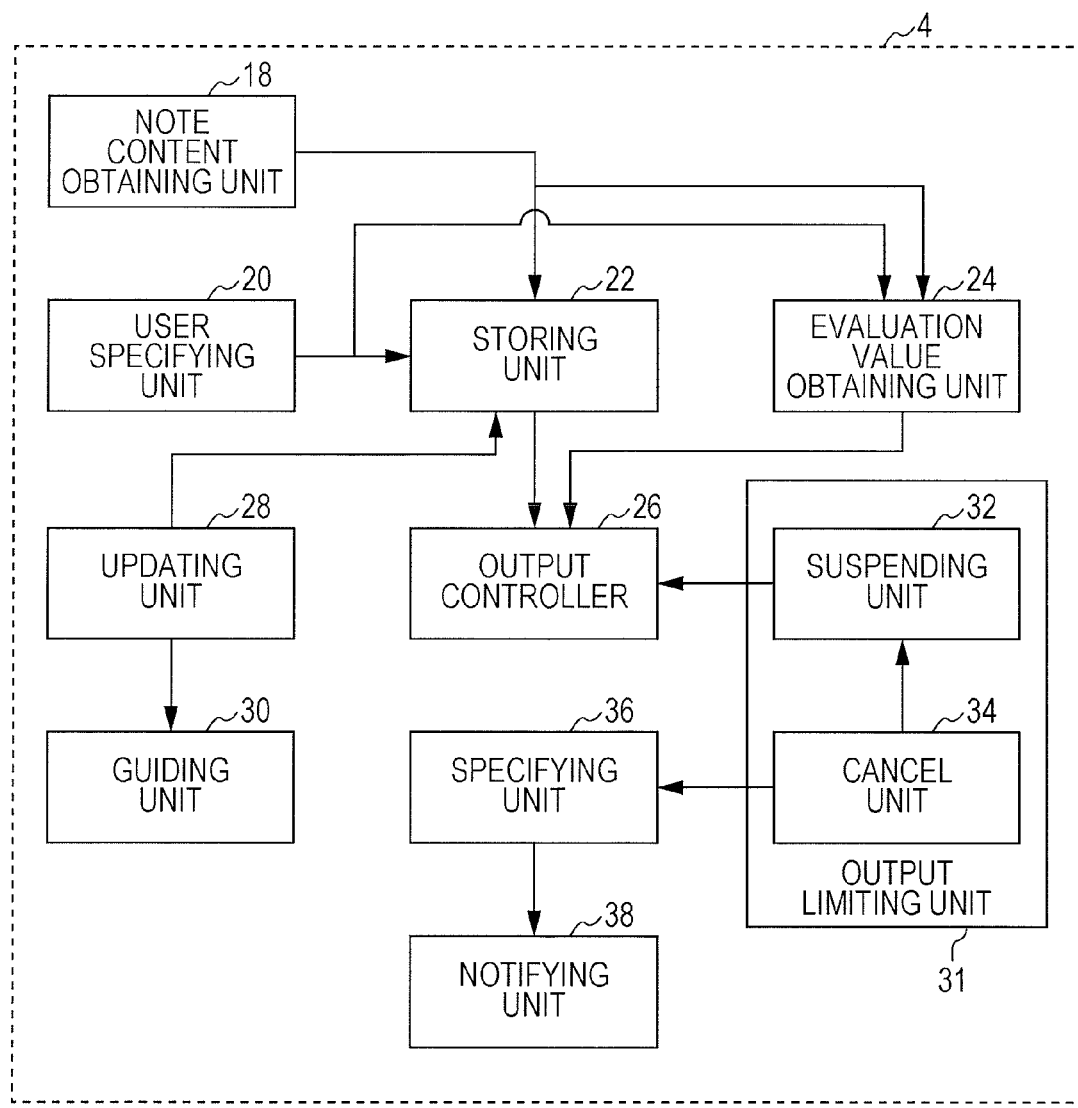
FIG. 10 is a diagram illustrating an example of functional blocks representing a group of functions realized in the server.

FIG. 10 is a diagram illustrating an example of functional blocks representing a group of functions realized in the server 4. As illustrated in FIG. 10, in the server 4, a note content obtaining unit 18, a user specifying unit 20, a storing unit 22, an evaluation value obtaining unit 24, an output controller 26, an updating unit 28, a guiding unit 30, an output limiting unit 31, a specifying unit 36, and a notifying unit 38 are realized. The output limiting unit 31 includes a suspending unit 32 and a canceling unit 34. These functions are realized when the controller 10 of the server 4 executes the processes illustrated in FIGS. 5, 7, 8, and 9 in accordance with the program stored in the storage unit 12.

Note Content Obtaining Unit

The note content obtaining unit 18 is realized mainly by the controller 10 and the network IF 14. The note content obtaining unit 18 obtains note content information indicating note content when a note is input to registered information. In this exemplary embodiment, the note content obtaining unit 18 receives note content information. Here, document X corresponds to "registered information". Also, the foregoing "portion to be corrected" and "importance" correspond to "note content information".

User Specifying Unit

The user specifying unit 20 is realized mainly by the controller 10. The user specifying unit 20 obtains user specification information that specifies the user who has input a note (see step S101 in FIG. 5). Here, user B corresponds to "the user who has input a note", and the user ID of user B corresponds to "user specification information".

Storing Unit

The storing unit 22 is realized mainly by the controller 10, the document DB, and the note DB. The storing unit 22 causes the note content information obtained by the note content obtaining unit 18 and the user specification information obtained by the user specifying unit 20 to be stored in a memory (note DB) in association with registered information (document X) (see step S106 in FIG. 5).

Evaluation Value Obtaining Unit

The evaluation value obtaining unit 24 is realized mainly by the controller 10. The evaluation value obtaining unit 24 obtains evaluation information on the basis of the note content information obtained by the note content obtaining unit 18 (see step S103 in FIG. 5). Here, the foregoing evaluation value corresponds to "evaluation information".

For example, the evaluation value obtaining unit 24 obtains basic evaluation information associated with the condition which the note content information obtained by the note content obtaining unit 18 satisfies from a basic evaluation information memory that stores conditions regarding note content information and basic evaluation information in association with each other, and then performs calculation on the basis of the obtained basic evaluation information, thereby generating evaluation information. Here, the hard disk 16 corresponds to "basic evaluation information memory", each of the information stored in the "importance" field of the score table illustrated in FIG. 6A and the information stored in the "portion to be corrected" field of the score table illustrated in FIG. 6B corresponds to "condition", and the information stored in the "score" field of the score table illustrated in FIG. 6A and the score table illustrated in FIG. 6B corresponds to "basic evaluation information".

Also, for example, the evaluation value obtaining unit 24 obtains attribute information representing the attribute of the user who has input the note (user B) on the basis of the user specification information obtained by the used specifying unit 20. Here, the reliability corresponds to "attribute". Then, the evaluation value obtaining unit 24 obtains evaluation information on the basis of the attribute information (see step S103 in FIG. 5).

For example, the evaluation value obtaining unit 24 obtains basic evaluation information associated with the condition which the attribute represented by the attribute information satisfies from a basic evaluation information memory that stores conditions regarding attributes and basic evaluation information in association with each other, and performs calculation on the basis of the obtained basic evaluation information, thereby generating evaluation information. Here, the hard disk 16 corresponds to "basic evaluation memory", the information stored in the "reliability" field of the score table illustrated in FIG. 6C corresponds to "condition", and the information stored in the "score" field of the score table illustrated in FIG. 6C corresponds to "basic evaluation information".

Output Controller

The output controller 26 is realized mainly by the controller 10 and the status DB. The output controller 26 outputs at least one of the registered information, and the note content information and the user specification information stored in the memory to the user as a request source in response to a request for outputting information from the user. Here, "execution of a view operation" corresponds to "request for outputting information", the note DB corresponds to "memory", the note content information associated with document X corresponds to "note content information stored in the memory", and the user ID of user B associated with document X corresponds to "user specification information stored in the memory". Also, the user who has performed the view operation corresponds to "user as a request source".

Specifically, if the user as a request source is different from the user specified by the user specification information stored in the memory, the output controller 26 does not output at least the user specification information, and outputs information other than the user specification information. Here, "if the user as a request source is different from the user specified by the user specification information (user B)" is "if the user as a request source is user C".

More specifically, if the user as a request source is different from the user specified by the user specification information and if the evaluation information obtained by the evaluation value obtaining unit 24 satisfies the evaluation condition, the output controller 26 does not output the user specification information stored in the memory, and outputs the registered information and the note content information stored in the memory. Also, if the user as a request source is different from the user specified by the user specification information and if the evaluation information obtained by the evaluation value obtaining unit 24 does not satisfy the evaluation condition, the output controller 26 does not output the note content information and the user specification information stored in the memory, and outputs only the registered information (see steps S202 to S204 in FIG. 7). That is, the output controller 26 sets the status of the registered information (document X) to the second status if the evaluation information obtained by the evaluation value obtaining unit 24 satisfies the evaluation condition. Then, if the user as a request source is different from the user specified by the user specification information and if the status of the registered information (document X) is the second status, the output controller 26 does not output the user specification information stored in the memory. If the user as a request source is different from the user specified by the user specification information and if the status of the registered information (document X) is the first status, the output controller 26 does not output the note content information and the user specification information stored in the memory.

Figure 7:
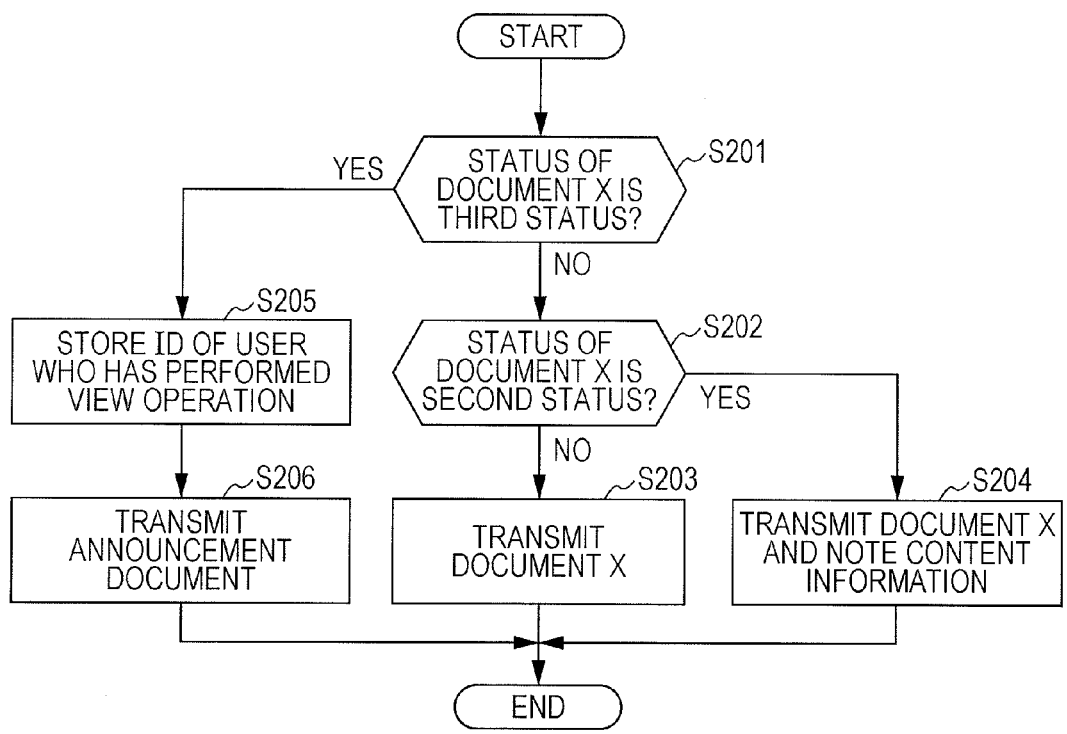
FIG. 7 is a flowchart illustrating an example of a process executed in the server.

If the user as a request source is different from the user specified by the user specification information and if the status of the registered information (document X) is the third status, the output controller 26 does not output any of the registered information, and the note content information and the user specification information stored in the memory (see steps S201 and S206 in FIG. 7). However, in this case, the output controller 26 causes a request source memory to store request source specification information (the user ID of user C) for specifying the user as a request source (user C) (see step S205 in FIG. 7). Here, the view DB corresponds to the request source memory.

On the other hand, if the user as a request source matches the user who has input the note, the output controller 26 outputs at least the registered information (document X).

Updating Unit

The updating unit 28 is realized mainly by the controller 10. The updating unit 28 updates the registered information (see step S302 in FIG. 8).

Guiding Unit

The guiding unit 30 is realized mainly by the controller 10. If the registered information is updated by the updating unit 28, the guiding unit 30 outputs guidance information for guiding check of update of the registered information to the user who has input the note (user B) (see step S401 in FIG. 9). Here, check guidance information corresponds to "guidance information".

Output Limiting Unit

The output limiting unit 31 is realized mainly by the controller 10. The output limiting unit 31 causes the output controller 26 not to perform "output of the note content information and the registered information stored in the memory" in response to a request for outputting information from another user different from the user who has input the note during the period from before the user who has input the note performs an operation for checking update of the registered information to after the operation has been performed. Here, a comment input operation corresponds to the foregoing "operation".

Suspending Unit

Figure 8:
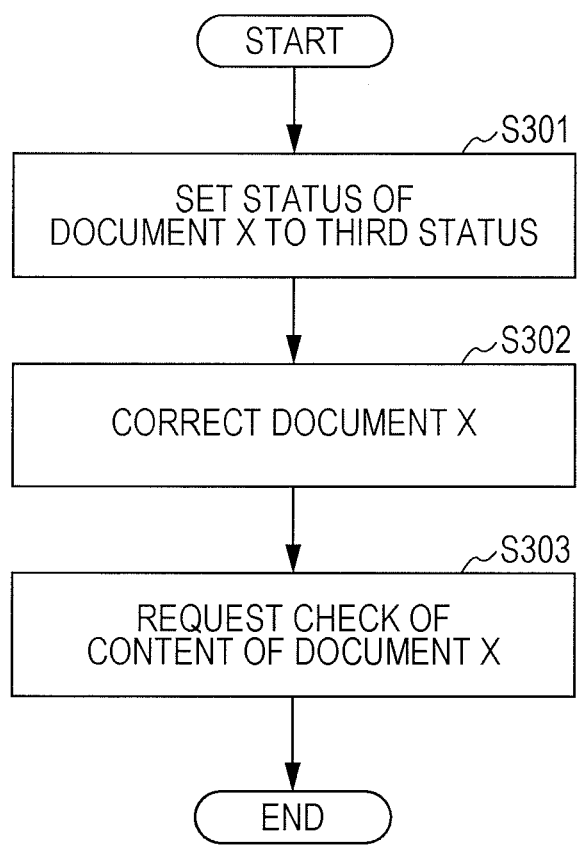
FIG. 8 is a diagram illustrating an example of an operation flow.

Specifically, the suspending unit 32 suspends "output of the note content information and the registered information stored in the memory in response to a request for outputting information from another user" performed by the output controller 26 before the user who has input the foregoing operation (see step S301 in FIG. 8). More specifically, if the foregoing suspension operation is performed, the suspending unit 32 sets the status of the registered information to the third status.

Canceling Unit

After the user who has input the note has performed the foregoing operation, the canceling unit 34 cancels the suspension of "output of the note content information and the registered information stored in the memory in response to a request for outputting information from another user" (see step S406 in FIG. 9). More specifically, after the cancel operation has been performed, the canceling unit 34 sets the status of the registered information (document X) to the first status. Alternatively, the canceling unit 34 may cancel the suspension when the user who has input the note performs the foregoing operation (comment input operation).

Specifying Unit

The specifying unit 36 is realized mainly by the controller 10 and the view DB. The specifying unit 36 specifies a user different from the user who has input the note, who has requested output of information during the foregoing period. Here, the user who has performed a view operation corresponds to "a user different from the user who has input the note".

For example, if the suspension has been canceled, that is, if the status of the registered information (document X) has been set to the first status, the specifying unit 36 reads the user ID of the user who has performed a view operation stored in the view DB in association with the registered information (document X) (see step S407 in FIG. 9).

Notifying Unit

The notifying unit 38 is realized mainly by the controller 10. The notifying unit 38 performs a notification process for the user specified by the specifying unit 36 (see step S407 in FIG. 9). In this exemplary embodiment, the notifying unit 38 transmits notification information to the user terminal 6 of the user specified by the user ID read from the view DB (user C).

The embodiment of the present invention is not limited to the above-described exemplary embodiment.

For example, "registered information" may be information other than a document (e.g., image information).

Also, for example, "note" that is input may be information representing the presence/absence of a problem about the content of the registered information. That is, the note content information may be information representing the presence/absence of a problem about the content of the registered information. In this case, for example, evaluation information (i.e., evaluation value), not basic evaluation information (i.e., score) is stored in the hard disk 16 in advance in association with a condition regarding the note content information. That is, evaluation information is stored in the hard disk 16 in advance in association with each of the condition that is satisfied when the note content information represents "the content of the registered information has a problem" and the condition that is satisfied when the note content information represents "the content of the registered information has no problem". Also, in this case, the controller 10 specifies the condition which the note content information satisfies, and reads and obtains the evaluation information associated with the condition.

Also, for example, update of document X may be performed anytime. For example, the controller 10 may regularly update document X.

Also, for example, the check guidance process may be performed anytime. For example, the check guidance process may be performed after a predetermined time has elapsed from the update of document X.

Also, for example, the controller 10 may judge whether the content of comment information satisfies a predetermined condition. When judging that the content of the comment information satisfies the condition, the controller 10 may set the status of document X to the first status.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:

obtaining note content information representing note content included in a note that has been input to registered information;

obtaining user specification information which specifies a user who has input the note;

storing the obtained note content information and the obtained user specification information in a memory in association with the registered information;

outputting at least one of the registered information and the note content information to a requestor;

determining whether the requestor is the different from the user who input the note; and in response to determining the requestor is different from the user who input the note, not outputting the user specification information.

2. The computer readable medium according to claim 1, the process further comprising:

obtaining evaluation information regarding appropriateness of the input note on the basis of the obtained note content information, wherein the outputting at least one of the registered information and the note content information comprises not outputting the note content information if the evaluation information does not satisfy the evaluation condition.

3. The computer readable medium according to claim 2, wherein the obtaining evaluation information includes obtaining, from a basic evaluation information memory that stores a condition regarding note content information and basic evaluation information serving as a basis of the evaluation information in association with each other, the basic evaluation information associated with the condition which the obtained note content information satisfies, and generating the evaluation information on the basis of the obtained basic evaluation information.

4. The computer readable medium according to claim 3, wherein the generating includes calculating the evaluation information by performing certain calculation on the basis of the obtained basic evaluation information.

5. The computer readable medium according to claim 2, wherein the evaluation information comprises an evaluation value based on at least one from among an importance of the obtained note content information, a reliability of the user who has input the note, a portion of the note to be corrected and a department of the user of the user who has input the note.

6. The computer readable medium according to claim 1, the process further comprising:

obtaining attribute information representing an attribute of the user who has input the note on the basis of the obtained user specification information; and obtaining evaluation information regarding appropriateness of the input note on the basis of the obtained attribute information, wherein the outputting at least one of the registered information and the note content information comprises not outputting the note content information if the evaluation information does not satisfy the evaluation condition.

7. The computer readable medium according to claim 6, wherein the obtaining evaluation information includes obtaining, from a basic evaluation information memory that stores a condition regarding an attribute and basic evaluation information serving as a basis of the evaluation information in association with each other, the basic evaluation information associated with the condition which the attribute represented by the obtained attribute information satisfies, and generating the evaluation information on the basis of the obtained basic evaluation information.

8. The computer readable medium according to claim 7, wherein the generating includes calculating the evaluation information by performing certain calculation on the basis of the obtained basic evaluation information.

9. The computer readable medium according to claim 6, wherein the evaluation information comprises an evaluation value based on at least one from among an importance of the obtained note content information, a reliability of the user who has input the note, a portion of the note to be corrected and a department of the user of the user who has input the note.

10. The computer readable medium according to claim 1, wherein the outputting includes outputting at least the registered information if the requestor is the same as the user who has input the note, the process further comprising:

updating the registered information; and outputting, if the registered information has been updated, guidance information for guiding check of update of the registered information to the user who has input the note.

11. The computer readable medium according to claim 10, the process further comprising:

suspending output of the registered information and the note content information stored in the memory in response to the request for outputting information from a requestor different from the user who has input the note during a period from before the user who has input the note performs an operation for checking update of the registered information to when the operation is performed or after the operation has been performed;

specifying the requestor that is different from the user who has input the note and that has performed the request for outputting information during the period; and performing notification regarding the specified user.

12. The computer readable medium according to claim 1, the process further comprising:

calculating an evaluation value of the input note based on at least one type of score;

determining whether the calculated evaluation value satisfies a predetermined evaluation condition, wherein the outputting of at least one of the registered information, and the note content information and the user specification information comprises outputting the note content information if the evaluation value of the input note is greater than or equal to the predetermined evaluation condition.

13. The computer readable medium according to claim 12, wherein the at least one type of score comprises at least one score from among a score based on an importance of the obtained note content information, a score based on a reliability of the user who has input the note, a score based on a portion of the note to be corrected and a score based on a department of the user of the user who has input the note.

14. An information processing apparatus comprising:

a note content obtaining unit that obtains note content information representing note content included in a note that has been input to registered information;

a user obtaining unit that obtains user specification information which specifies a user who has input the note;

a storing unit which stores the note content information obtained by the note content obtaining unit and the user specification information obtained by the user obtaining unit in a memory in association with the registered information; and an output controller that outputs at least one of the registered information and the note content information to a requestor, wherein the output controller determines that whether the requestor is different from the user who has input the note, and in response to determining the requestor is different from the user who input the note, the controller does not output at least the user specification information.

15. An information processing method comprising:

obtaining note content information representing note content included in a note that has been input to registered information;

obtaining user specification information which specifies a user who has input the note;

storing the obtained note content information and the obtained user specification information in a memory in association with the registered information;
outputting at least one of the registered information and the note content formation to a requestor;
determining whether the requestor is the different from the user who input the note; and
in response to determining the requestor is different from the user who input the note, not outputting the user specification information.

\* \* \* \* \*